(12) United States Patent
Nesbit et al.

(10) Patent No.: US 10,604,359 B2
(45) Date of Patent: Mar. 31, 2020

(54) HIGH RESOLUTION VACUUM GRIPPERS THAT UTILIZE BI-STABLE FLOW VALVES

(71) Applicant: The Boeing Company, Chicago, IL (US)

(72) Inventors: Ashleigh Raoul Nesbit, Williamstown (AU); Peter N. Steele, Warranwood (AU)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/896,956

(22) Filed: Feb. 14, 2018

(65) Prior Publication Data

US 2019/0248600 A1    Aug. 15, 2019

(51) Int. Cl.
*B65G 47/91* (2006.01)
*B25J 15/06* (2006.01)
*B65G 49/06* (2006.01)

(52) U.S. Cl.
CPC ........ *B65G 47/917* (2013.01); *B25J 15/0625* (2013.01); *B65G 49/061* (2013.01)

(58) Field of Classification Search
CPC ............... B25J 15/0052; B25J 15/0616; B25J 15/0625; B29C 31/08; B29C 70/00; B29C 70/38; B29C 53/04; B65G 47/917; B65G 49/061
See application file for complete search history.

(56) References Cited

U.S. PATENT DOCUMENTS

| 5,287,829 | A * | 2/1994 | Rose ................. B06B 1/183 123/197.1 |
| 6,409,434 | B1 * | 6/2002 | Winther ............. B65G 47/252 406/15 |
| 7,648,182 | B2 * | 1/2010 | Salimkhan .......... B25J 15/04 294/188 |
| 8,528,955 | B2 * | 9/2013 | Robinson .......... B25J 11/0045 294/185 |
| 9,403,280 | B2 * | 8/2016 | Regan ............... B25J 15/0675 |
| 2012/0215358 | A1 * | 8/2012 | Gettings .............. B25J 5/005 700/259 |
| 2014/0341700 | A1 * | 11/2014 | Vopat ................ B25J 15/0052 414/805 |

(Continued)

OTHER PUBLICATIONS

Mehregany et al, Microelectromechanical Systems for Aerodynamics Applications, Sep. 1996, Abstract, https://apps.dtic.mil/docs/citations/ADA314322 (Year: 1996).*

(Continued)

*Primary Examiner* — Stephen A Vu
(74) *Attorney, Agent, or Firm* — Duft & Bornsen, PC

(57) ABSTRACT

Systems and methods are provided for utilizing enhanced vacuum gripping techniques. One embodiment is a method that includes locating an array of valves for an end effector, selectively switching valves within the array between open states and closed states based on a shape of a work piece that the end effector will transport, selectively applying vacuum through a plurality of valves in a shape that corresponds with the shape of the work piece, disposing the end effector at the work piece while the vacuum is applied to grip the work piece, and picking up the work piece by moving the end effector while the vacuum is applied.

29 Claims, 19 Drawing Sheets

(56) References Cited

U.S. PATENT DOCUMENTS

2014/0367037 A1* 12/2014 Metschan ........... B32B 38/1858
  156/285

OTHER PUBLICATIONS

Sietse Bruggeling, "Fokker—NLR pilot plant," retrieved Feb. 5, 2018, online at https://www.youtube.com/watch?v=XBYZML-JwQU.
Robot end effector; Wikipedia; retrieved Jan. 9, 2018, online at https://en.wikipedia.org/wiki/Robot_end_effector.
Bullmer, "Composites cutting and robotic unload Bullmer and Cytec/Solvay cooperation", retrieved Feb. 5, 2018, online at https://www.youtube.com/watch?v=4i-E1hAfvp8.
Solvay, "Solvay Composite Materials Application Center," retrieved Feb. 5, 2018, online at https://www.youtube.com/watch?v=x-ttXkdVYTA.
Topcut Bullmer, "Automotives and Composites," retrieved Feb. 5, 2018, online at https://www.youtube.com/watch?v=mGod1is9LaQ.

* cited by examiner

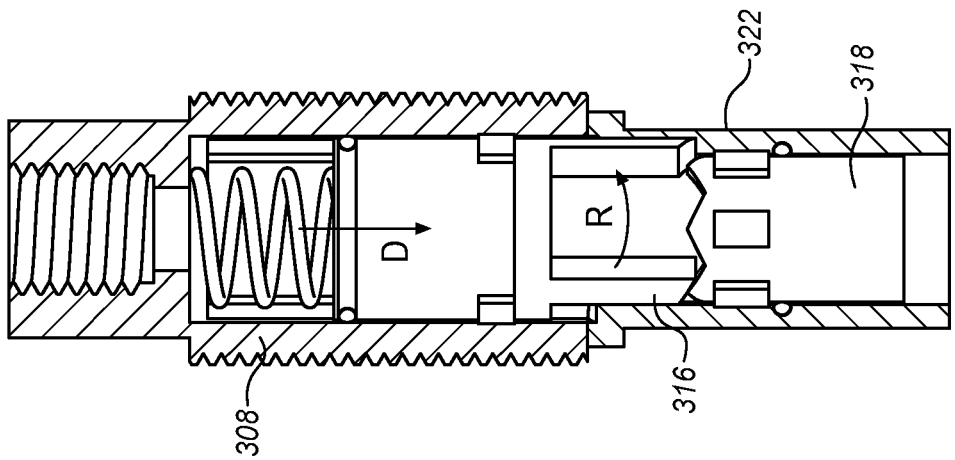
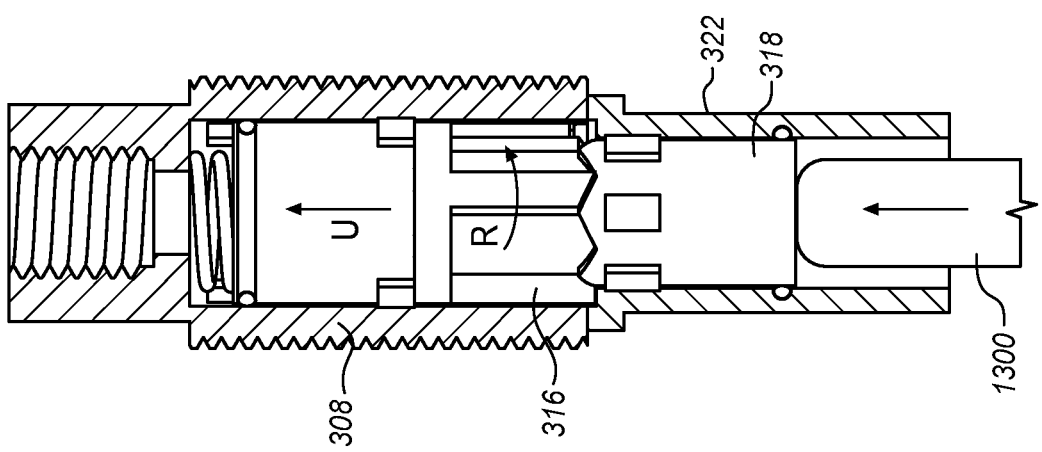
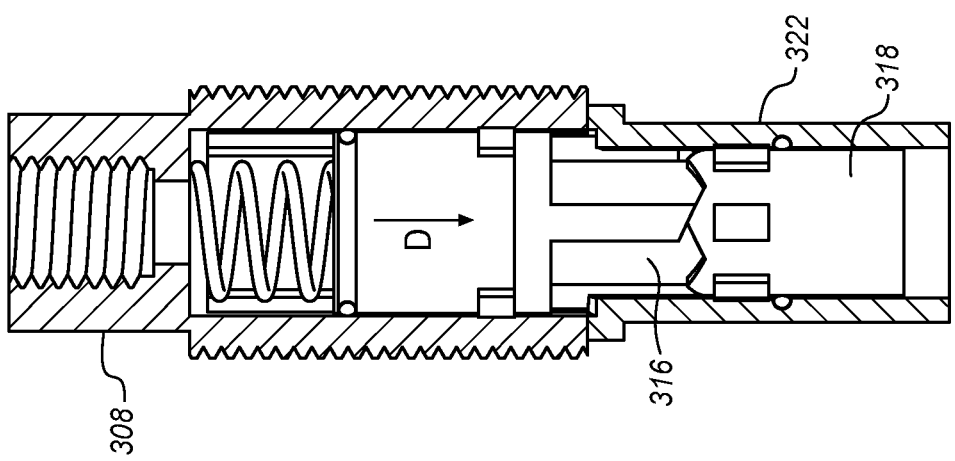

HIGH RESOLUTION VACUUM GRIPPERS THAT UTILIZE BI-STABLE FLOW VALVES

FIELD

The disclosure relates to the field of robotics, and in particular, to end effectors for robots.

BACKGROUND

Composite parts, such as Carbon Fiber Reinforced Polymer (CFRP) parts, are initially laid-up in multiple layers that together form a laminate which is cured into a solid composite part. Individual fibers within each layer of the laminate are aligned parallel with each other, but different layers may exhibit different fiber orientations in order to increase the strength of the resulting composite part along different dimensions.

A work piece cut from a sheet of carbon fiber fabric may be used to form a layer of the laminate, and each work piece may be cut into a customized shape. The shape of each work piece, even for a single composite part, may vary substantially. Transporting work pieces to a mandrel for layup onto a laminate remains a time-consuming and difficult process, particularly when a work piece has been cut into a complex shape. For example, a work piece may be larger or heavier than a human is capable of carrying. Furthermore, transport of a work piece increases the risk of fabric distortion, which may result in a composite part having less than a desired strength.

Therefore, it would be desirable to have a method and apparatus that take into account at least some of the issues discussed above, as well as other possible issues.

SUMMARY

Embodiments described herein provide systems and methods that enable a robot to selectively apply vacuum along specific portions of an end effector. This allows the end effector to pick up work pieces of varying shapes, without picking up nearby scrap material. It also ensures that a fabric of carbon fiber is not distorted during the transportation process One embodiment is a method that includes locating an array of valves for an end effector, selectively switching valves within the array between open states and closed states based on a shape of a work piece that the end effector will transport, selectively applying vacuum through a plurality of valves in a shape that corresponds with the shape of the work piece, disposing the end effector at the work piece while the vacuum is applied to grip the work piece, and picking up the work piece by moving the end effector while the vacuum is applied.

A further embodiment is a non-transitory computer readable medium embodying programmed instructions which, when executed by a processor, are operable for performing a method. The method includes locating an array of valves for an end effector, selectively switching valves within the array between open states and closed states based on a shape of a work piece that the end effector will transport, selectively applying vacuum through a plurality of valves in a shape that corresponds with the shape of the work piece, disposing the end effector at the work piece while the vacuum is applied to grip the work piece, and picking up the work piece by moving the end effector while the vacuum is applied.

Yet another embodiment is an apparatus that includes a valve assembly. The valve assembly includes a valve seat guide, a valve seat disposed within the valve seat guide that travels axially within the valve seat guide and includes a first set of vents that extend axially through the valve seat, and a biasing device that biases the valve seat in a first axial direction within the valve seat guide. The valve assembly also includes a rotating cam valve disposed within the valve seat guide that contacts the valve seat, the rotating cam valve comprising a second set of vents that extend axially through the rotating cam valve and align with the first set of vents, and a push cylinder disposed within the valve seat guide that contacts the rotating cam valve and applies force that rotates the rotating cam valve within the valve seat guide, breaking alignment of the second set of vents with the first set of vents.

Still another embodiment is a system that includes a robot. The robot includes a controller that directs operations of the robot in accordance with a Numerical Control (NC) program, and an end effector comprising at least one array of valve assemblies. Each valve assembly comprises a bi-stable valve.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 2-14 are views of a reconfigurable valve utilized by an end effector of a robot in an illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
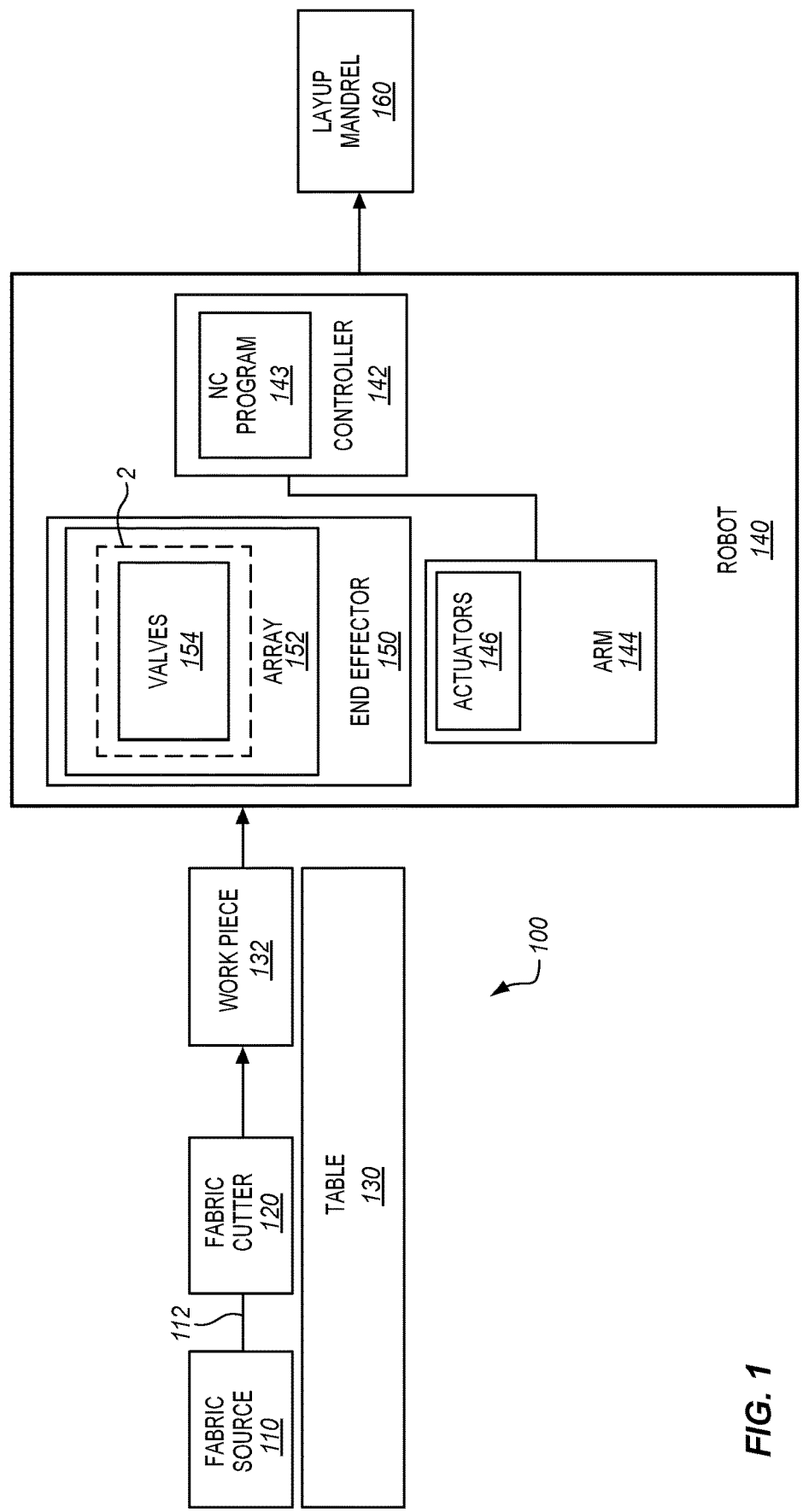
FIG. 1 is a block diagram of a layup system that includes an end effector that selectively applies vacuum in the shape of a work piece in an illustrative embodiment.

FIG. 1 is a block diagram of a layup system 100 that includes a robot 140 with an end effector 150 that selectively applies vacuum pressure in the shape of a work piece 132 in an illustrative embodiment. In this embodiment, layup system 100 includes fabric source 110, (e.g., a roll of carbon fiber fabric), as well as a fabric cutter 120, which cuts fabric 112 (e.g., a sheet of composite material) from fabric source 110 into a desired shape for a work piece 132. Work piece 132 rests at table 130, and is transported to layup mandrel 160 by robot 140.

In this embodiment, robot 140 includes controller 142, which directs the operations of end effector 150 and arm 144 (e.g., by controlling the actuators 146). Controller 142 may direct the operations of various components of robot 140 to move end effector 150 and/or controllably configure the array 152 of the valves 154, in accordance with a Numerical Control (NC) program (e.g., NC program 143). Controller 142 may be implemented, for example, as custom circuitry, as a hardware processor executing programmed instructions, or some combination thereof.

Figure 2:
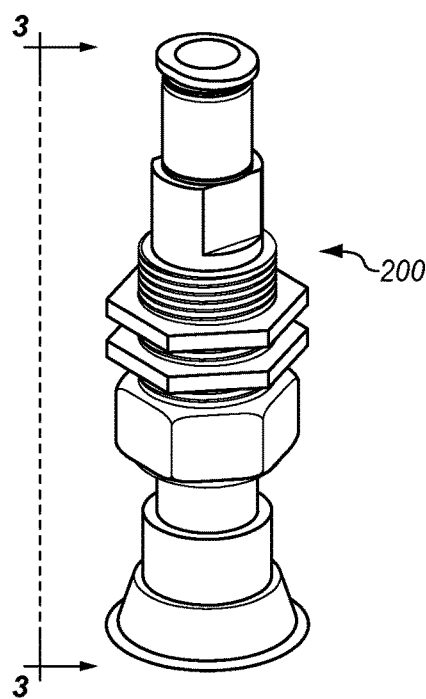

Further details of individual ones of the valves 154 of robot 140 are provided with regard to FIGS. 2-14. FIG. 2 is a perspective view of a valve assembly 200 that corresponds with region 2 of FIG. 1. An exploded perspective view of valve assembly 200 is provided in FIG. 3, which corresponds with view arrows 3 of FIG. 2. According to FIG. 3, in this embodiment, the valve assembly 200 includes pneumatic fitting 302, mount lock nut 304, mount lock nut 306, and valve seat guide 308. Spring 310 is placed inside of valve seat guide 308, as is valve seat wiper seal 312, valve seat 314, rotating cam valve 316, and push cylinder 318. Gasket 320 is located below push cylinder 318 in an axial direction D, as is frame 322, which serves as a rotating cam valve guide. Push cylinder wiper seal 324 is disposed below frame 322, as is union lock nut 326 and vacuum cup 328 (e.g., a push-on vacuum cup).

Figure 3:
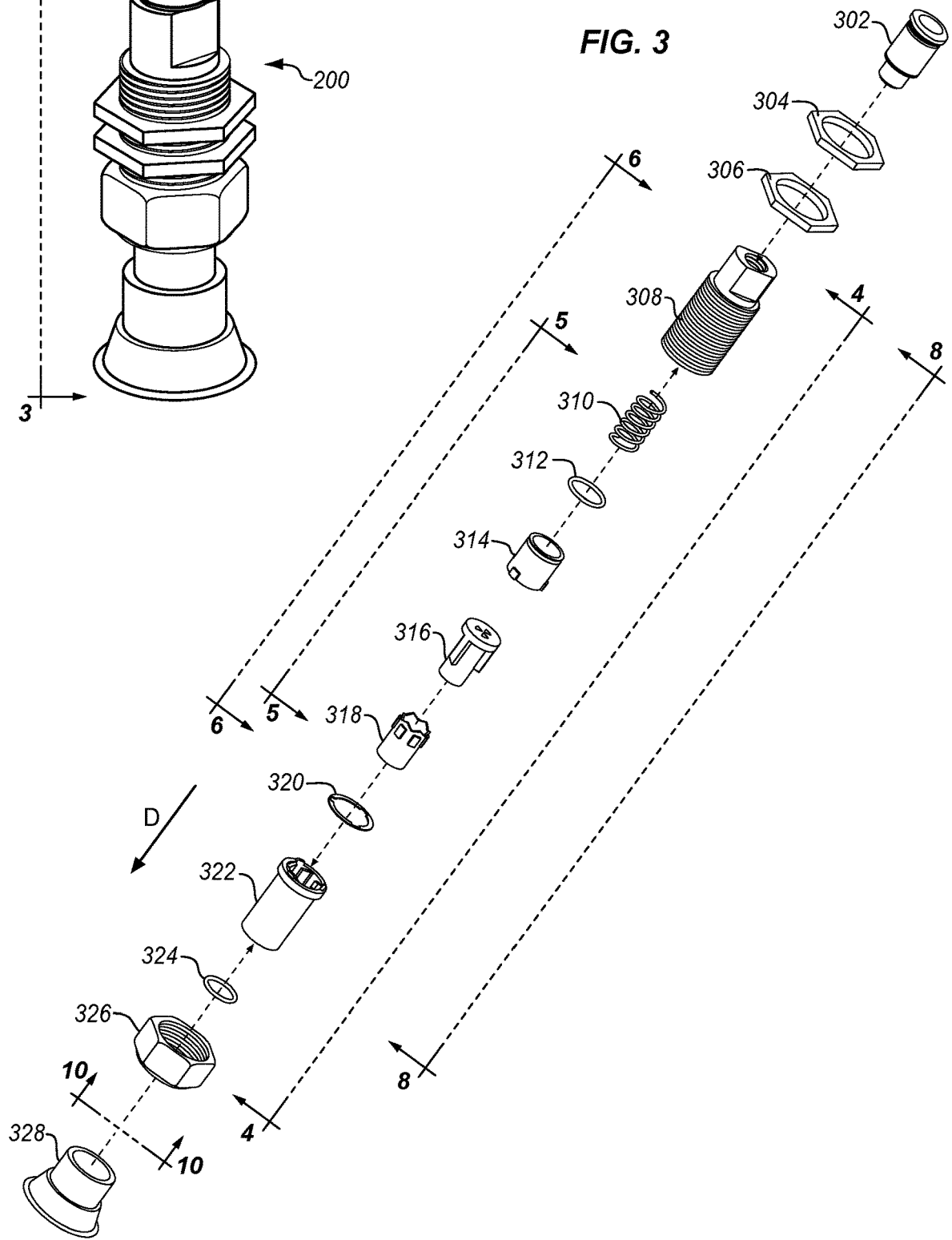
Figure 4:
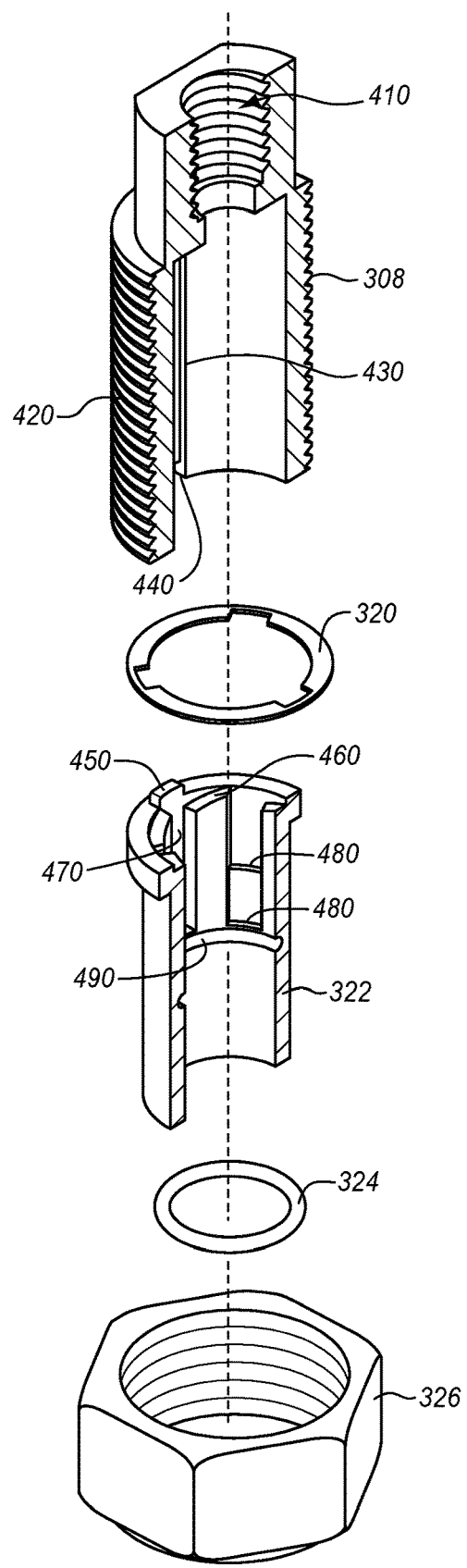

FIG. 4 is an exploded perspective view of a portion of valve assembly 200 wherein valve seat guide 308 and frame 322 have been subjected to section cuts. FIG. 4 corresponds with view arrows 4 of FIG. 3. According to FIG. 4, valve seat guide 308 includes female threading 410 and male threading 420. Valve seat guide 308 also includes channel 430, which valve seat 314 slides along, and notch 440. Frame 322 includes locating pin 450, which aligns with locating notch 440. In this manner, notch 440 prevents rotation of frame 322. Frame 322 also includes an angled slip face 460, channel 470, stops 480, and mounting groove 490.

Figure 5:
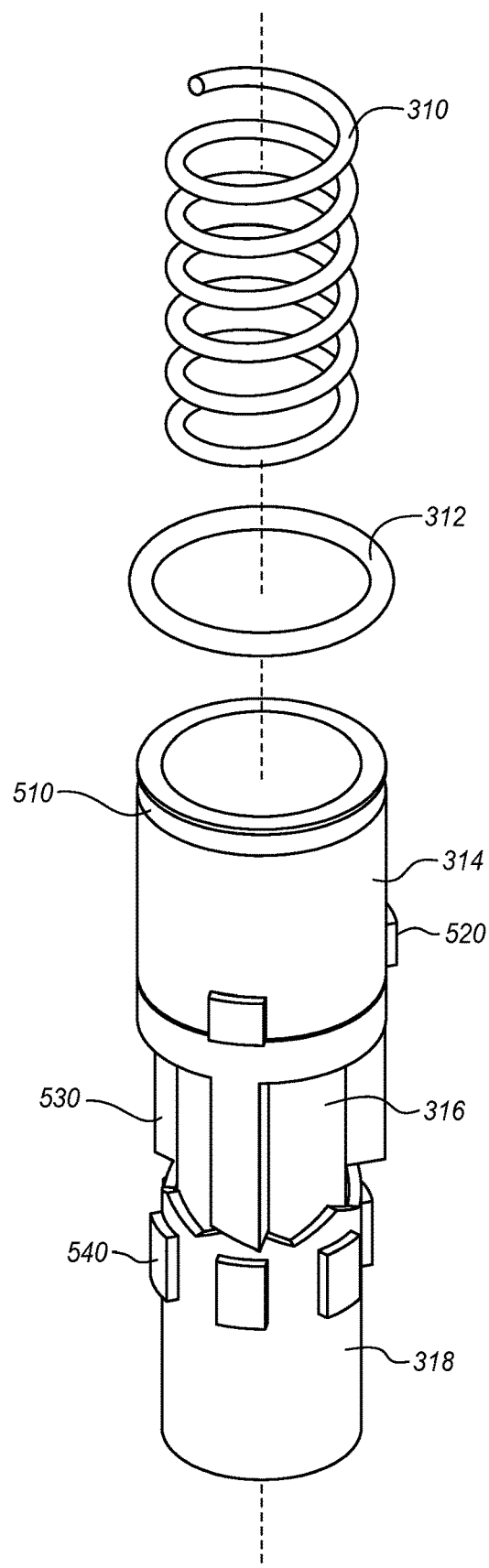

FIG. 5 is a partially exploded perspective view of a portion of valve assembly 200 that corresponds with view arrows 5 of FIG. 3. As shown in FIG. 5, valve seat 314 includes groove 510, and guide pins 520. Meanwhile, rotating cam valve 316 includes guide pins 530, and push cylinder 318 includes guide pins 540. Guide pins 530 contact the guide pins 540.

Figure 6:
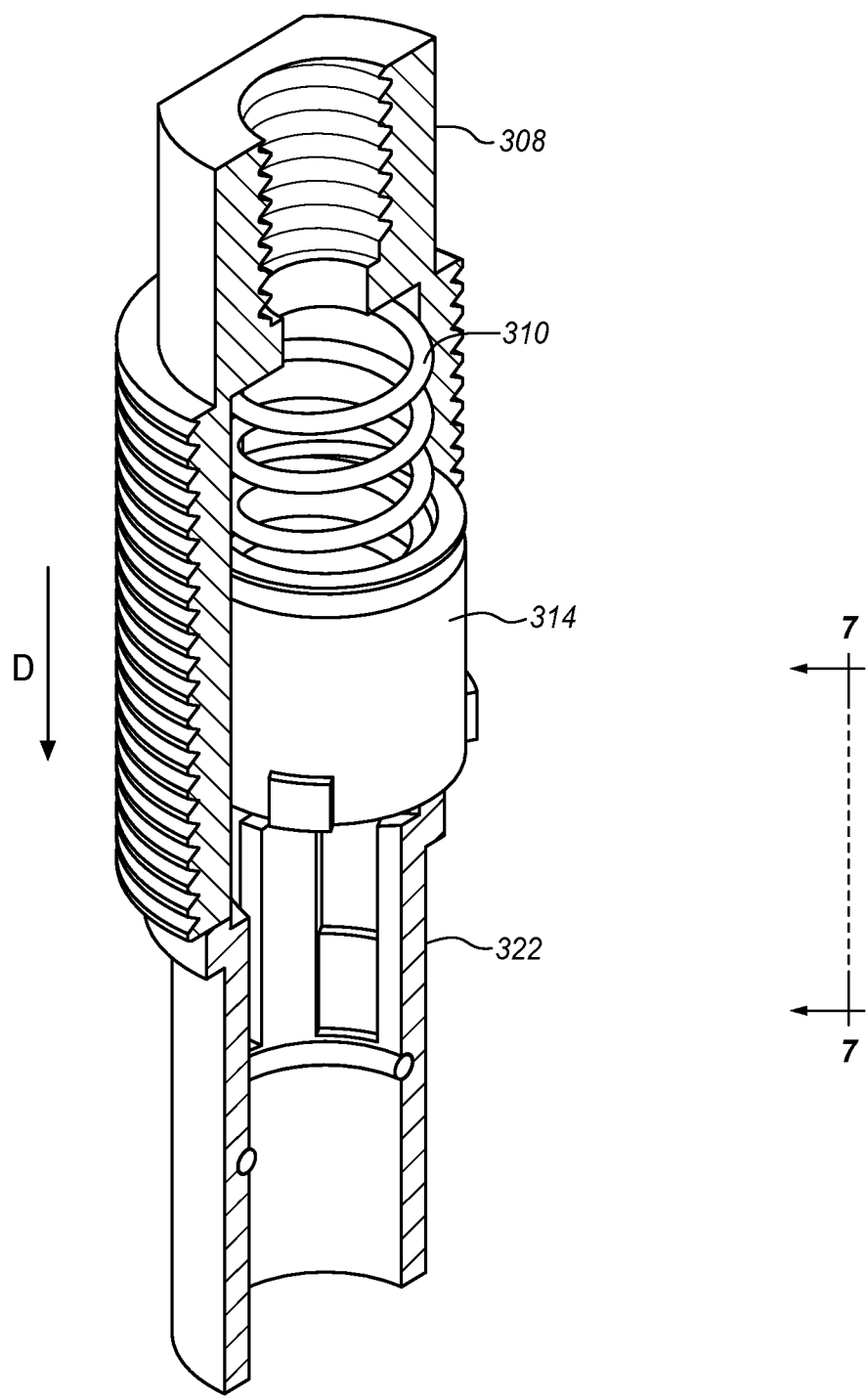

FIG. 6 is a perspective view of an assembled portion of valve assembly 200 where valve seat guide 308 and frame 322 have been subjected to section cuts. FIG. 6 corresponds with view arrows 6 of FIG. 3. As shown in FIG. 6, spring 310 is held within valve seat guide 308, and acts as a biasing device which applies force that biases valve seat 314 in axial direction D.

Figure 7:
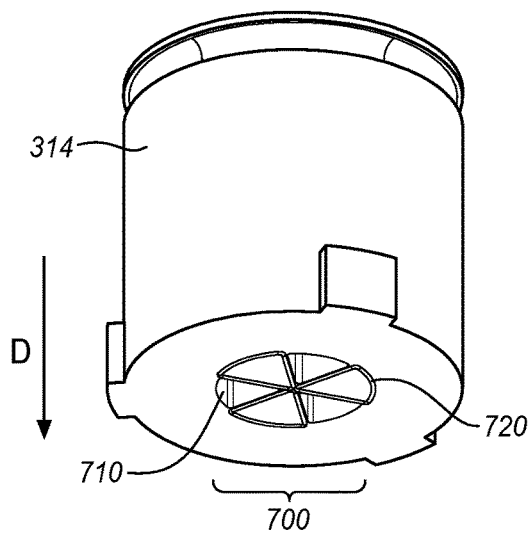

FIG. 7 is a perspective view of valve seat 314 which corresponds with view arrows 7 of FIG. 6. According to FIG. 7, valve seat 314 includes a first set 700 of vents 710, which proceeds through valve seat 314 in the axial direction D. Valve seat 314 also includes valve seals 720. Each vent 710, and each valve seal 720, occupies a sixty degree arc of valve seat 314.

Figure 8:
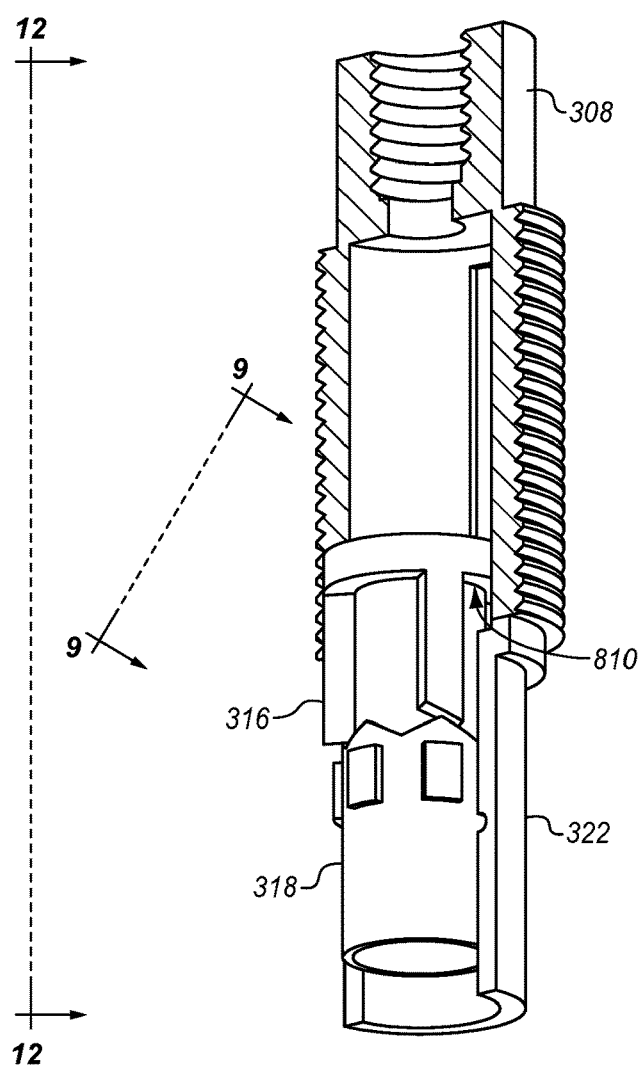

FIG. 8 is another perspective view of an assembled portion of valve assembly 200 where valve seat guide 308 and frame 322 have been subjected to section cuts. FIG. 8 corresponds with view arrows 8 of FIG. 3. As shown in FIG. 8, rotating cam valve 316 rests atop push cylinder 318. Rotating cam valve 316 is prevented from traveling too deeply into frame 322 by physical interference with lip 810.

Figure 9:
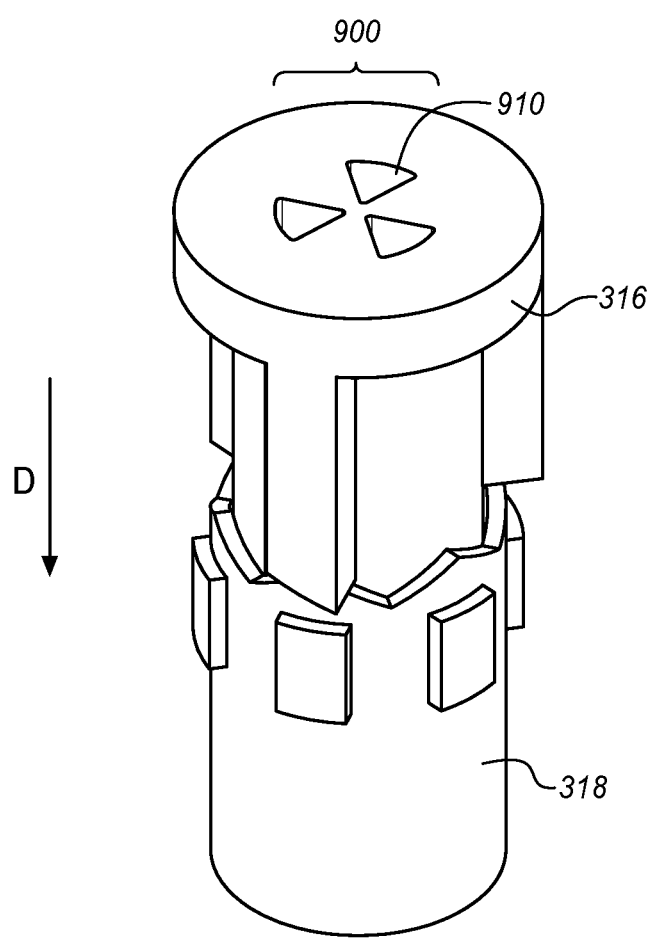

FIG. 9 illustrates further details of rotating cam valve 316 and push cylinder 318, and corresponds with view arrows 9 of FIG. 8. Specifically, FIG. 9 illustrates a first set 900 of vents 910 that penetrate through rotating cam valve 316 along axial direction D. Each vent 910 occupies a sixty degree arc of rotating cam valve 316, and vents are separated by sixty degrees arcs that are not vented. These features become relevant with regard to the following FIGS. 10-11.

Figure 11:
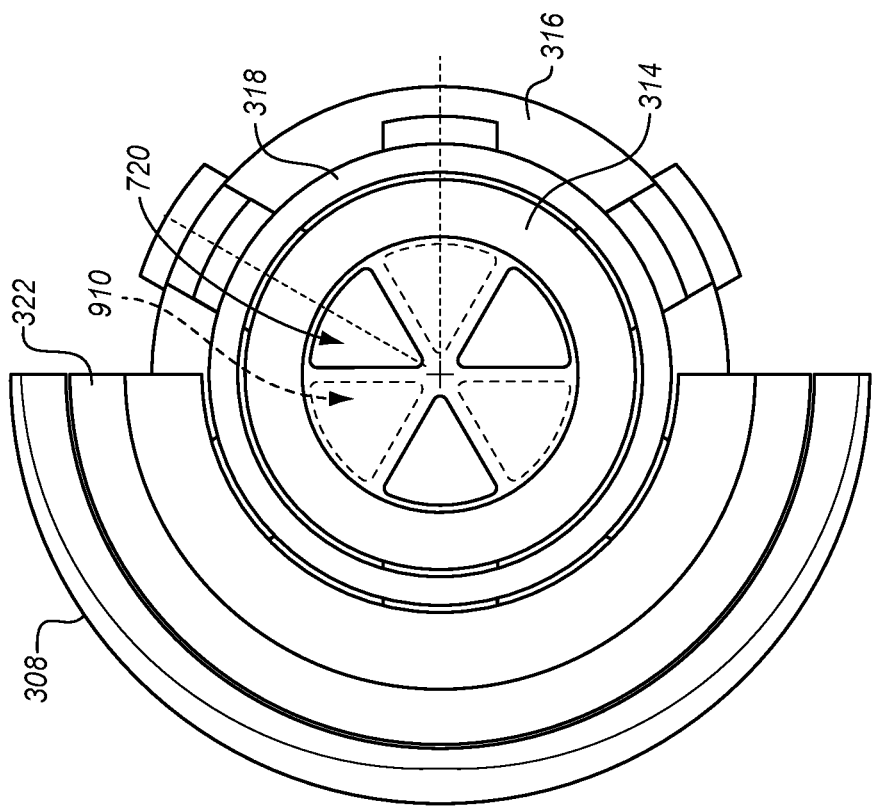
Figure 10:
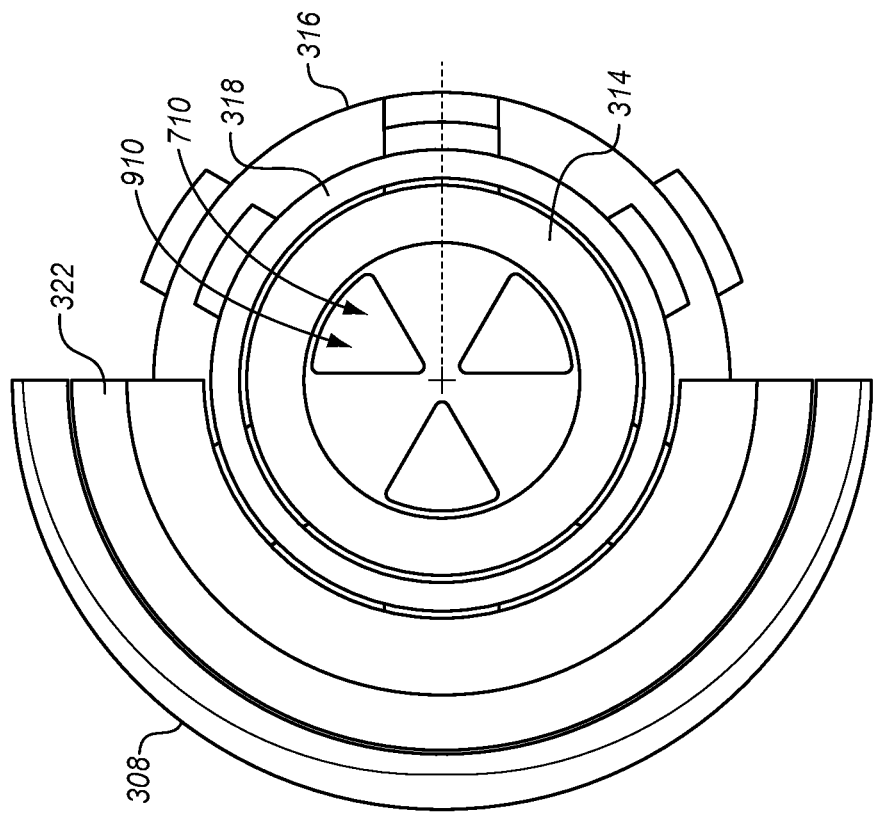

FIGS. 10-11 are bottom views of valve assembly 200 wherein valve seat guide 308 and frame 322 have been subjected to section cuts, and correspond with view arrows 10 of FIG. 3. FIG. 10 illustrates valve assembly 200 in an open state, while FIG. 11 illustrates valve assembly 200 in a closed state. In the open state, first set 700 of vents 710 at valve seat 314 align with second set 900 of vents 910 at rotating cam valve 316. This enables air to flow through valve assembly 200 (e.g., in order to generate suction). In the closed state, valve seals 720 at valve seat 314 align with second set 900 of vents 910 at rotating cam valve 316. This prevents air flow through valve assembly 200. In this manner, the amount of air flow through valve assembly 200 is controlled.

FIGS. 12-14 provide side views of valve assembly 200, wherein valve seat guide 308 and frame 322 are subjected to section cuts. FIGS. 12-14 correspond with view arrows 12 of FIG. 8. As shown in FIG. 13, when push cylinder 318 is pressed by an actuator 1300 in direction U, the force applied by actuator 1300 causes rotating cam valve 316 to rotate along direction R (e.g., by thirty degrees). When force is released, rotating cam valve 316 is biased back to a rest position by spring 310, and rotates again in direction R (e.g., by another thirty degrees). This causes second set 900 of vents 910 at rotating cam valve 316 to alternately align with second set 700 of vents 710, or with valve seals 720. Thus, pushing push cylinder 318 iteratively cycles the valve assembly 200 between the closed state and the open state, rotating the rotating cam valve 316 from zero to sixty degrees.

Illustrative details of the operation of valve assembly 200 will be discussed with regard to FIG. 15. Assume, for this embodiment, that a user wishes to selectively configure one or more of the valve assemblies 200 into open states and closed states, such that an array 152 of valve assemblies 200 applies vacuum in a predetermined shape corresponding with a work piece 132.

Figure 15:
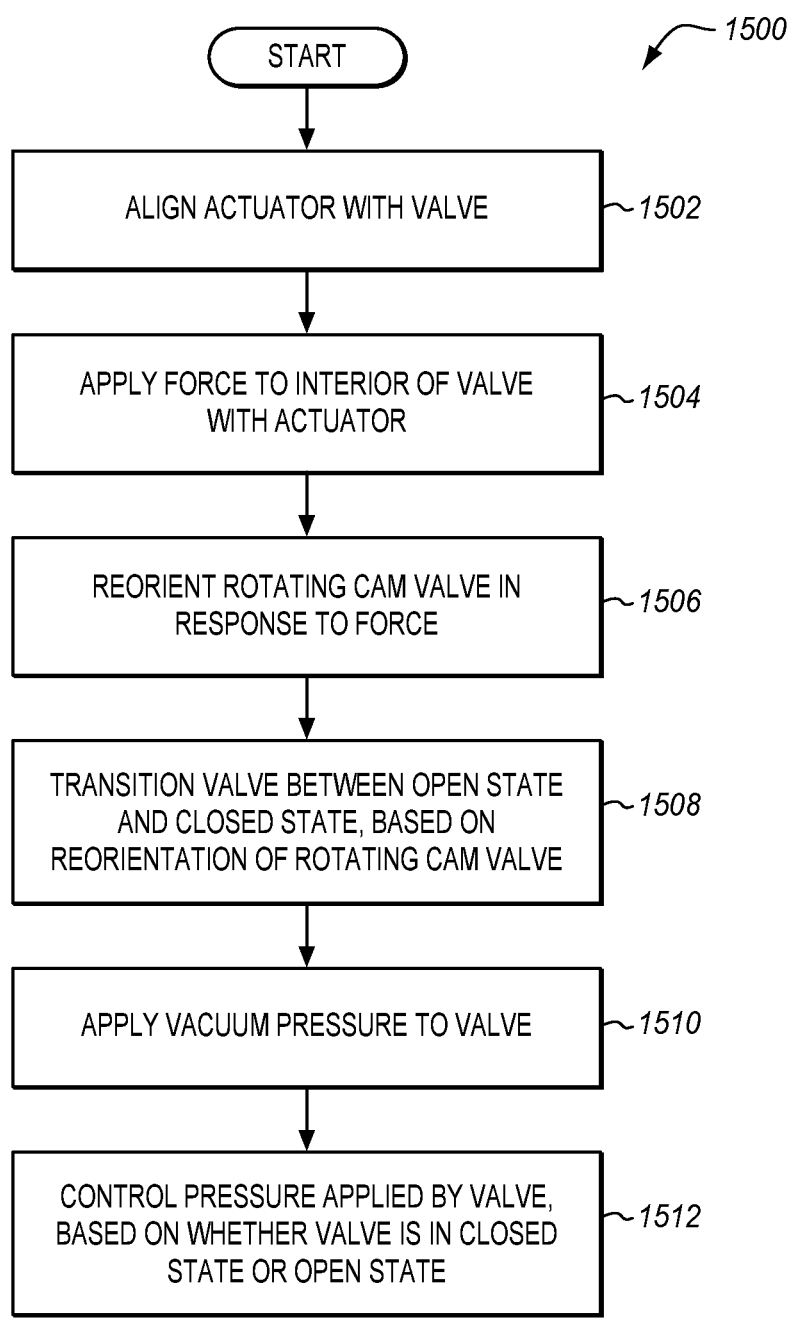
FIG. 15 is a flowchart illustrating a method for reconfiguring a valve in an illustrative embodiment.

FIG. 15 is a flowchart illustrating a method 1500 for reconfiguring a valve in an illustrative embodiment. The steps of method 1500 are described with reference to layup system 100 of FIG. 1, but those skilled in the art will appreciate that method 1500 may be performed in other systems. The steps of the flowcharts described herein are not all inclusive and may include other steps not shown. The steps described herein may also be performed in an alternative order.

In step 1502, actuator 1300 is aligned with a valve assembly 200. This may comprise axially aligning actuator 1300 with valve assembly 200, such that actuator 1300 may travel axially within frame 322. Actuator 1300 applies force to an interior of valve assembly 200, such as at push cylinder 318 (step 1504). This may be performed by pressing actuator 1300 in direction U after actuator 1300 has come into contact with push cylinder 318. Pushing force applied by actuator 1300 reorients the rotating cam valve 316 by turning rotating cam valve 316 in response to the force (step 1506). When rotating cam valve 316 is reoriented, the second set 900 of vents 910 rotates as well. Hence, based on the reorientation of rotating cam valve 316, valve assembly 200 transitions between the open state and the closed state (step 1508). In the open state, second set 700 of vents 710 is aligned with first set 900 of vents 910. In the closed state, this alignment is broken. Valve assembly 200 is a bi-stable mechanism in that it stably resides in the open state, and also stably resides in the closed state. Steps 1502-1508 may be performed any number of desired times for any desired number of valve assemblies 200 in order to ensure that vacuum will be applied in a desired shape by end effector 150.

With valve assembly 200 transitioned into a desired state, a controller 142 for robot 140 may apply vacuum pressure to valve assembly 200 (step 1510). Depending on whether or not the valve assembly 200 is in the open state or the closed state, pressure applied by valve assembly 200 is controlled (step 1512). That is, if valve assembly 200 is in the open state, it applies a vacuum via vacuum cup 328. Alternatively, if valve assembly 200 is in a closed state, it does not apply a vacuum. Method 1500 provides a substantial benefit over prior techniques, because it provides a straightforward process for configuring individual valves within an array from on to off. This enables an array of valves to apply vacuum in any suitable shape for a work piece. Furthermore, an electronic component is not required at each and every valve to configure the valves. This reduces the expense of an array of valves, and also reduces the amount of weight borne by end effector 150 (i.e., because end effector 150 includes fewer components). Because valve assembly 200 is bi-stable, it stably remains in the its current state (i.e., closed or open) regardless of whether or not vacuum is applied. Thus, vacuum assembly 200 remains in the same state throughout the picking up and placement of a work piece 132 onto a layup mandrel 160.

In some embodiments, leakage may occur, resulting from a less-than-optimal seal with work piece 132. This may be accounted for by leaving one or more valves 154 open in response to detecting a drop in vacuum pressure.

Figure 16:
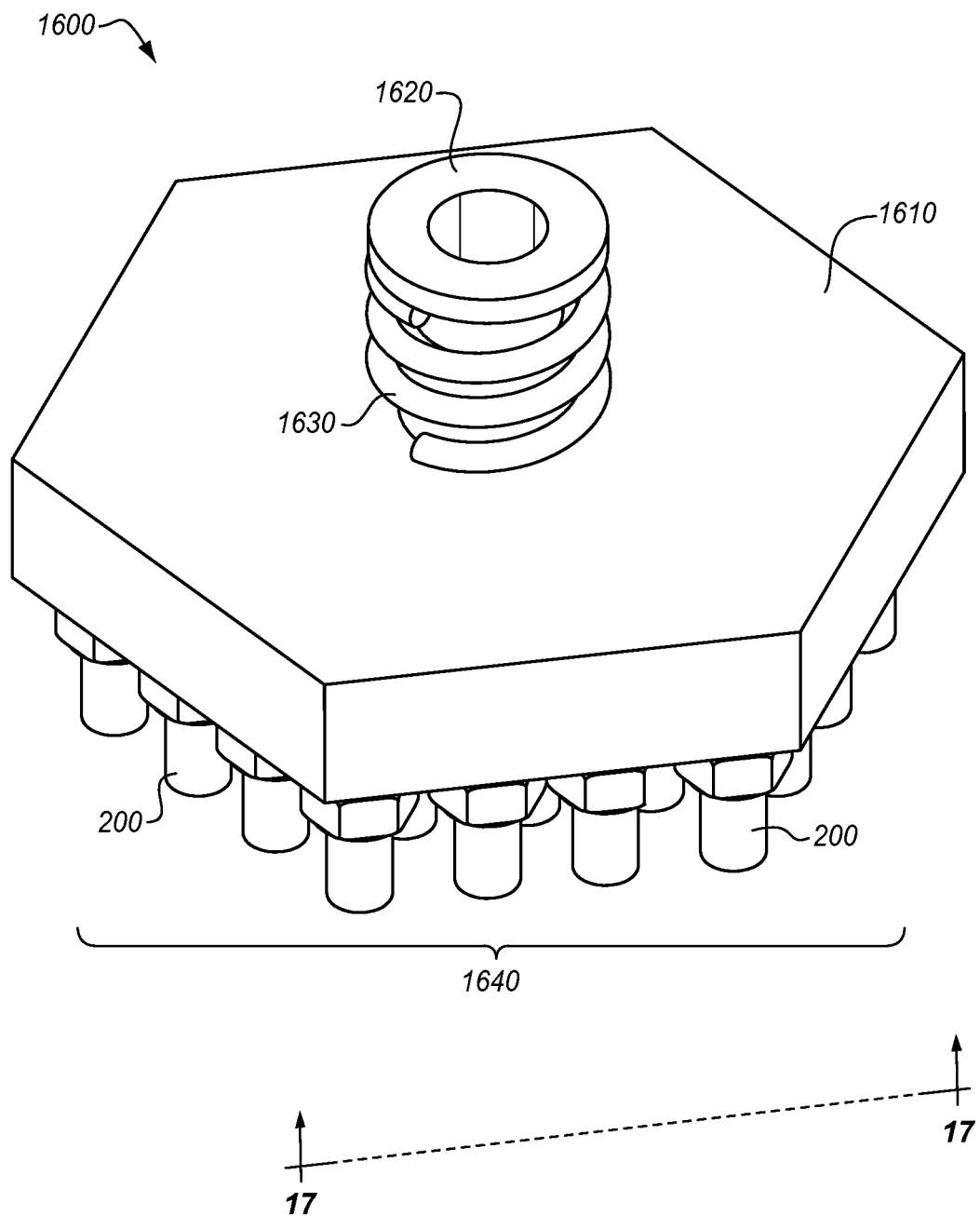
FIGS. 16-18 are views of a vacuum gripper that includes an array of valve assemblies utilized by an end effector of a robot in an illustrative embodiment.
Figure 17:
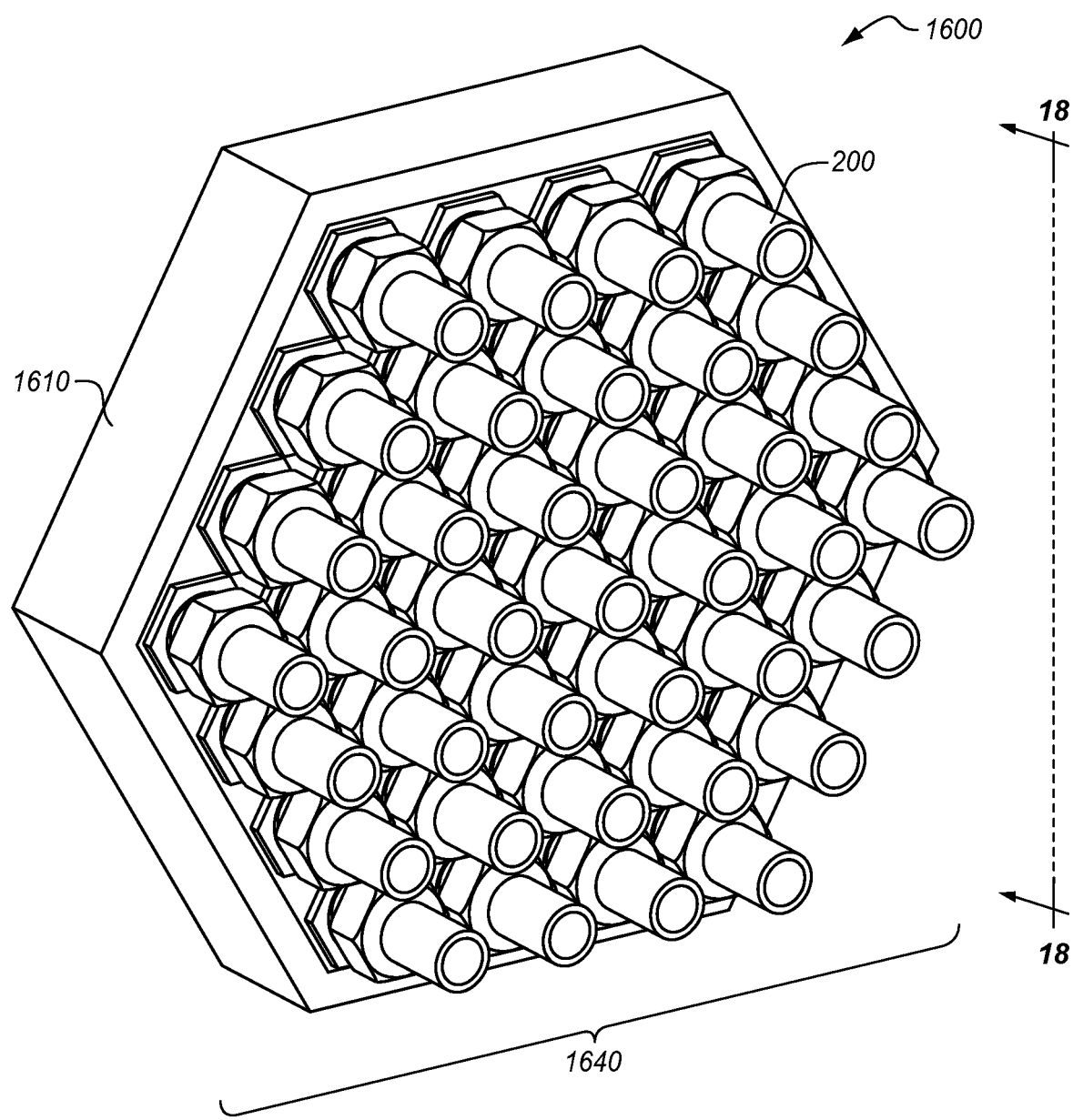
Figure 18:
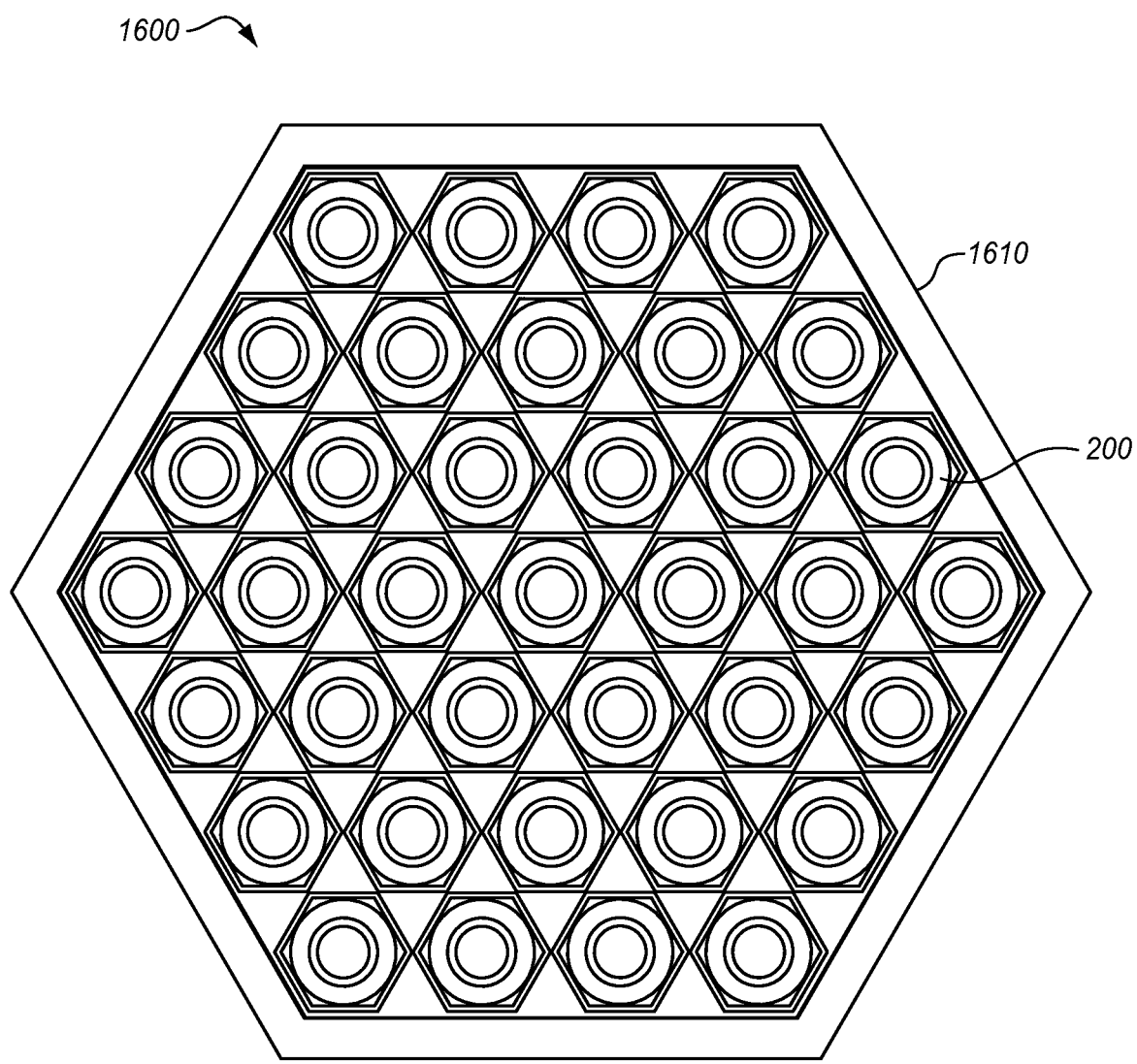

FIGS. 16-18 are views of a vacuum gripper 1600 comprising an array 1640 of valve assemblies 200 utilized by an end effector 150 of a robot 140 in an illustrative embodiment. FIG. 17 corresponds with view arrows 17 of FIG. 16, and FIG. 18 corresponds with view arrows 18 of FIG. 17. According to FIGS. 16-18, valve assemblies 200 may be arranged in a hexagonal grid, and each of the valve assemblies 200 may be separated, for example, by a distance between two and five centimeters or less. Valve assemblies 200 are disposed at body 1610 of vacuum gripper 1600. Vacuum gripper 1600 also includes vacuum supply port 1620, and a spring 1630 which acts as a compliance device for vacuum gripper 1600. That is, spring 1630 enables vacuum gripper 1600 to physically deflect when it is pressed against a work piece 132.

Figure 19:
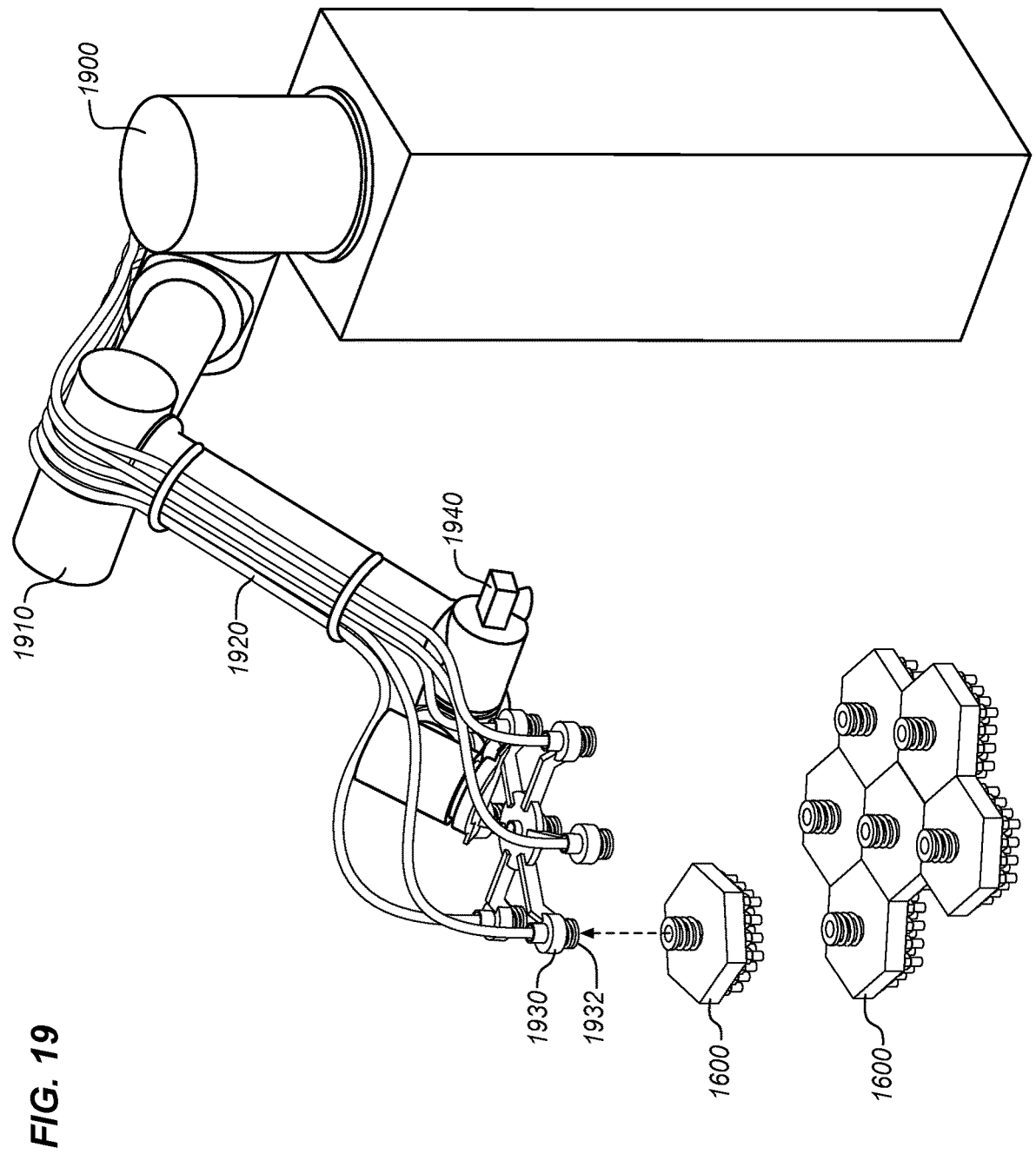
FIG. 19 is a perspective view of a robot that includes an end effector that includes multiple vacuum grippers that include arrays of reconfigurable valves in an illustrative embodiment.

FIG. 19 is a perspective view of a robot 1900 that includes an end effector with multiple vacuum grippers that include arrays of reconfigurable valve assemblies in an illustrative embodiment. In this embodiment, robot 1900 is driven by actuators 1910, and robot 1900 includes dress 1920 (e.g., cables for vacuum pumps, power, etc.) which provides vacuum to end effector 1930. Individual ones of the vacuum grippers 1600 may be attached to ports 1932 at end effector 1930. One or more sensors 1940 are also included at robot 1900, which may acquire images of or determine distances to components in proximity to end effector 1930.

Figure 20:
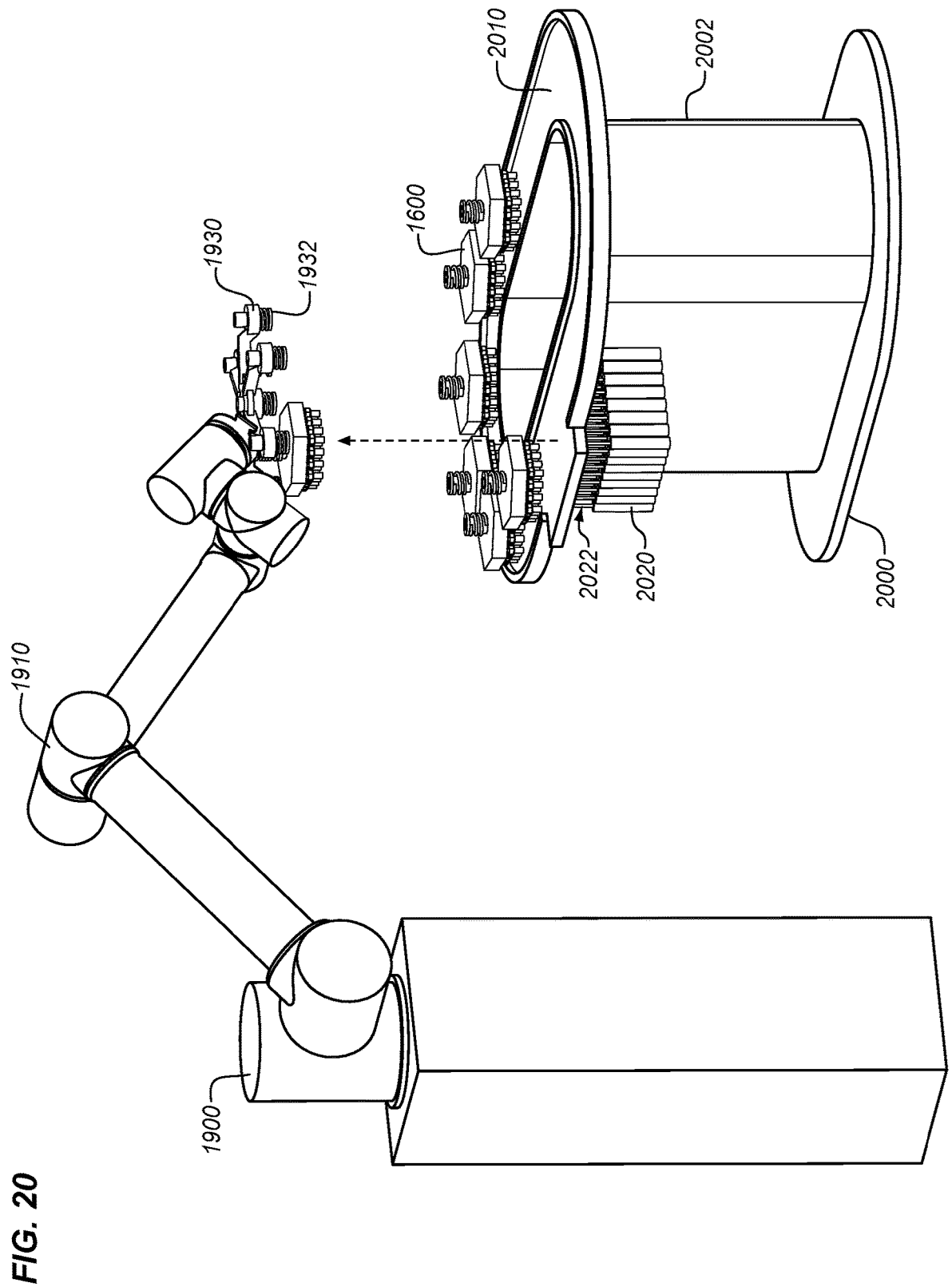
FIG. 20 is a perspective view of a robot utilizing a table that reconfigures vacuum grippers in an illustrative embodiment.

FIG. 20 is a perspective view of a robot 1900 utilizing a table 2000 that reconfigures vacuum grippers 1600 in an illustrative embodiment. As shown in FIG. 20, robot 1900 may place vacuum grippers 1600 onto conveyor 2010, which is located at frame 2002 of table 2000. Vacuum grippers 1600 travel along conveyor 2010, until they reach group 2020 of actuators 2022. Each actuator has a diameter smaller than a diameter of a valve assembly 200. Actuators 2022 are selectively driven in accordance with an NC program (e.g., NC program 143 being performed by controller 142) in order to transition selected valve assemblies 200 between closed states and open states.

Figure 21:
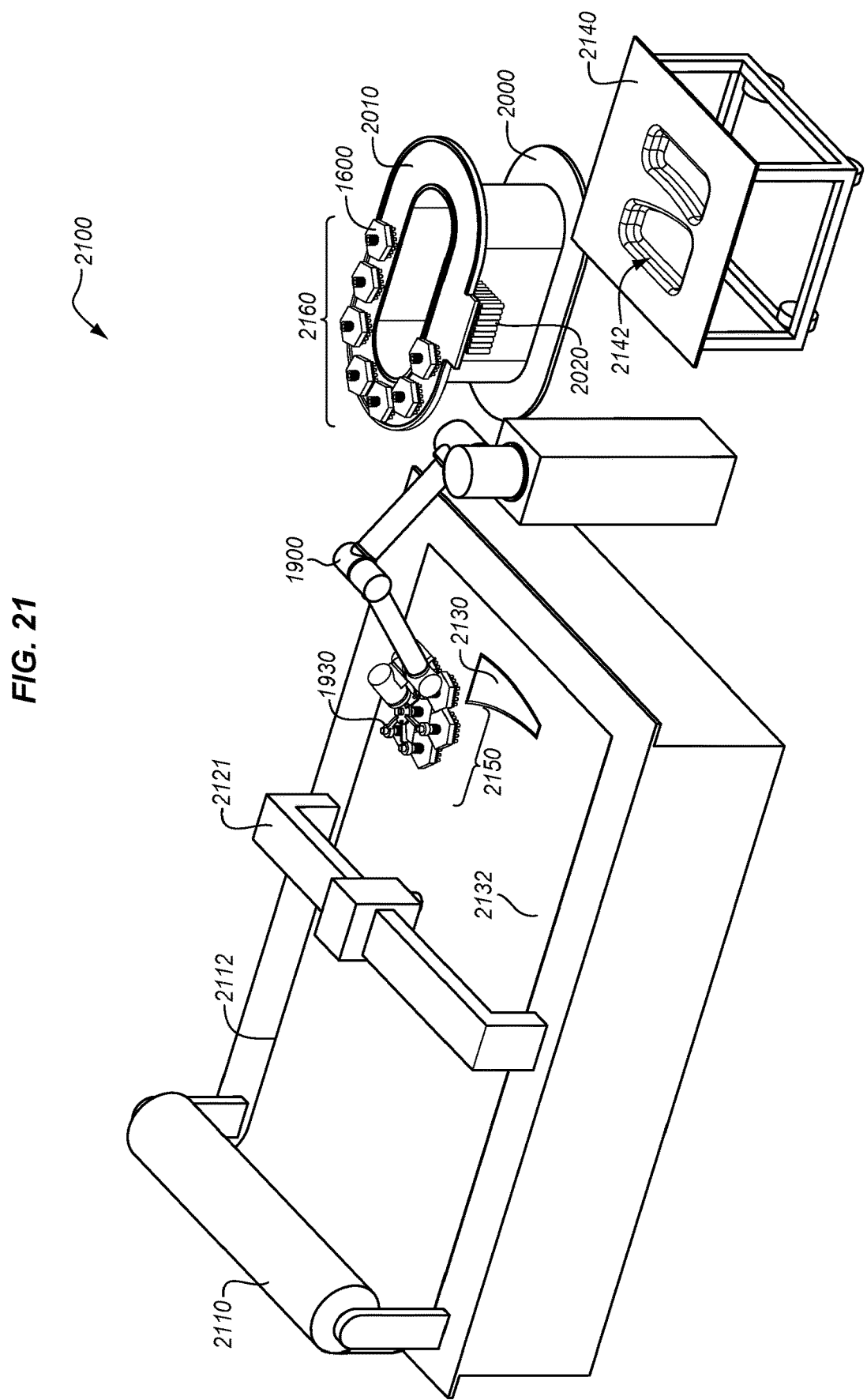
FIG. 21 is a perspective view of a layup system that is actively picking and placing work pieces having custom shapes in an illustrative embodiment.

FIG. 21 is a perspective view of a layup system 2100 that utilizes the components described in the foregoing FIGS. in order to apply vacuum when picking and placing work pieces having varied shapes. According to FIG. 21, a roll 2110 dispenses carbon fiber fabric 2112 which is cut by cutting machine 2121 into one or more work pieces 2130 of varying shapes. Robot 1900 picks up those work pieces 2130 via end effector 1930, and places work pieces 2030 onto mandrel 2140. For example, end effector 1930 may place a work piece 2130 at contour 2142. While end effector 1930 is moving a work piece 2130 via a first set 2150 of the vacuum grippers 1600, a second set 2160 of the vacuum grippers 1600 may be reconfigured at table 2000. Robot 1900 may then drop off the first set 2150 of the vacuum grippers 1600 at table 2000, and pick up the second set 2160 of the vacuum grippers 1600 at table 2000. The second set 2160 of the vacuum grippers 1600, having been reconfigured, are already prepared to apply vacuum in the shape of the work piece 2130 that is next. Furthermore, since the second set 2160 of vacuum grippers 1600 is configured to the shape of work piece 2130, they grip work piece 2130 without gripping objects external to work piece 2130 (e.g., scrap 2132). In this manner, table 2000 enables robot 1900 to spend more time picking and placing work pieces instead of reconfiguring itself.

Figure 22:
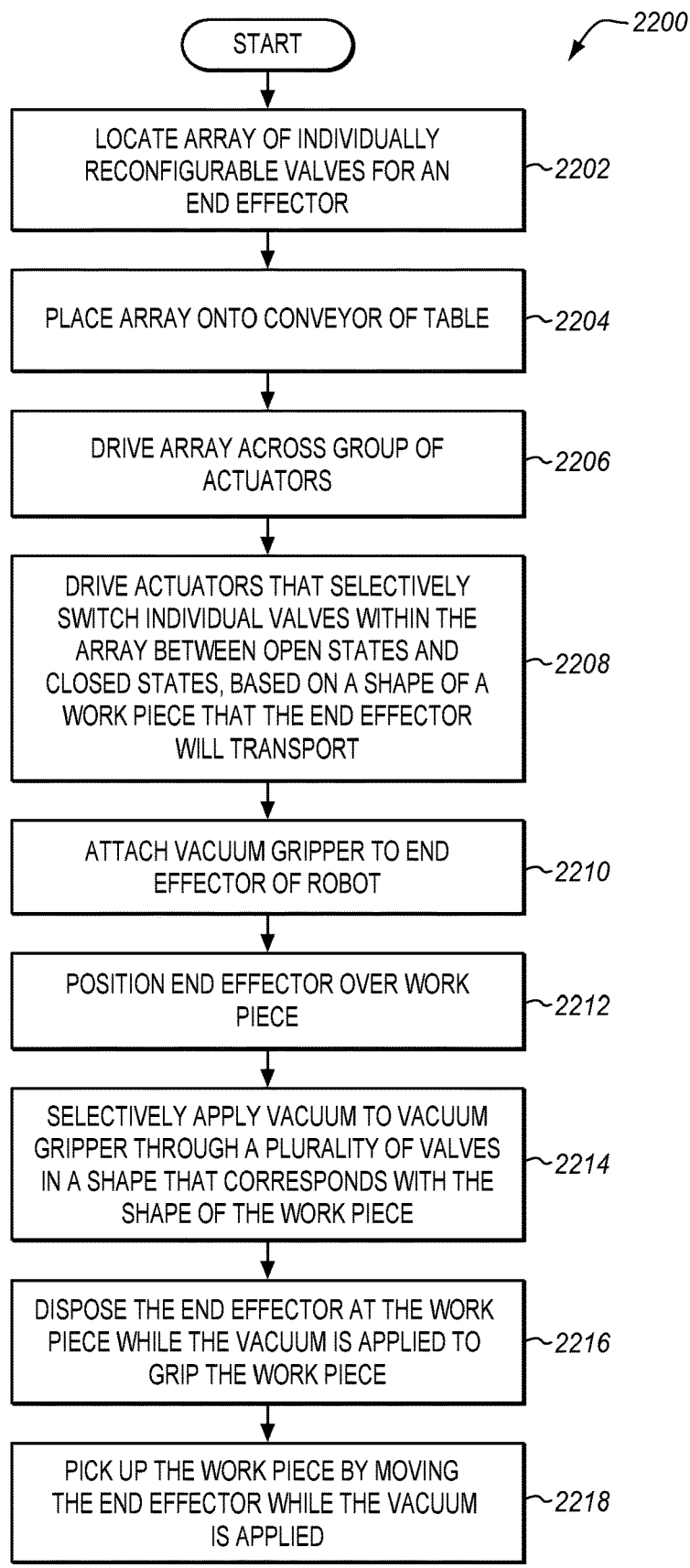
FIG. 22 is a flowchart illustrating a method of operating a layup system in an illustrative embodiment.

FIG. 22 is a flowchart illustrating a method 2200 of operating a layup system in an illustrative embodiment. According to FIG. 22, method 2200 includes locating an array 1640 of valve assemblies 200 for an end effector that are individually reconfigurable (step 2202). The array 1640 is placed onto a conveyor 2010 of table 2000 (step 2204), and is driven/conveyed across group 2020 of actuators 2022 (step 2206). While array 1640 is located at group 2020, controller 142 selectively drives actuators 2022 to switch individual valve assemblies within array 1640 between open states and closed states based on a shape of a work piece 2130 that the end effector will transport (step 2208). For example, NC program 143 may indicate a shape of a work piece 2130 that will be picked up, and controller 142 may determine actuators 2022 that in combination form the shape. In a further example, sensors 1940 visualize work piece 2130 and dynamically determine the shape of work piece 2130. Controller 142 may then determine which valve assemblies 200 are already in the open state, and drive any of the determined actuators 2022 that are aligned with valve assemblies that are in the closed state. Controller 142 may utilize similar logic to switch valve assemblies 200 that are not within the shape to the closed state.

In a further embodiment, an optical or other one of sensors 1940 (e.g., located at end effector 1930) determines the shape of each new work piece, and determines a pattern of valve assemblies to be turned on in order to pick up the shape. This information is passed on to group 2020 of actuators 2022, which dynamically reconfigure vacuum grippers 1600 into desired states.

With vacuum grippers 1600 reconfigured, vacuum grippers 1600 are attached to end effector 1930 of robot 1900 (step 2210), and end effector 1930 is positioned over work piece 2130 (step 2212). This may be performed based on input from an NC program which has been generated with knowledge of where the work piece 2130 will be located. Alternatively, sensors 1940 at robot 1900 may be utilized to determine the shape and/or location of work piece 2130, and end effector 1930 may be aligned with work piece 2130 based on this input from sensors 1940. Controller 142 directs robot 1900 to apply vacuum to vacuum grippers 1600 through a plurality of valves 154 in a shape that corresponds with the shape of work piece 2130 (step 2214). For example, controller 142 may causes valve assemblies 200 in the open state (but not valve assemblies 200 in the closed state) to apply vacuum pressure to work piece 2130. The end effector 1930 is then disposed at the work piece 2130 while the vacuum is applied to grip the work piece (step 2216), and robot 1900 picks up the work piece by moving the end effector while the vacuum is applied (step 2218). Robot 1900 releases the applied vacuum in order to place the work piece 2130 at the mandrel 2140. The motions of end effector 1930 during transport may be directed by an NC program, or may be directed based on input from sensors 1940.

EXAMPLES

In the following examples, additional processes, systems, and methods are described in the context of layup system that utilizes reconfigurable valve assemblies in an illustrative embodiment.

Figure 23:
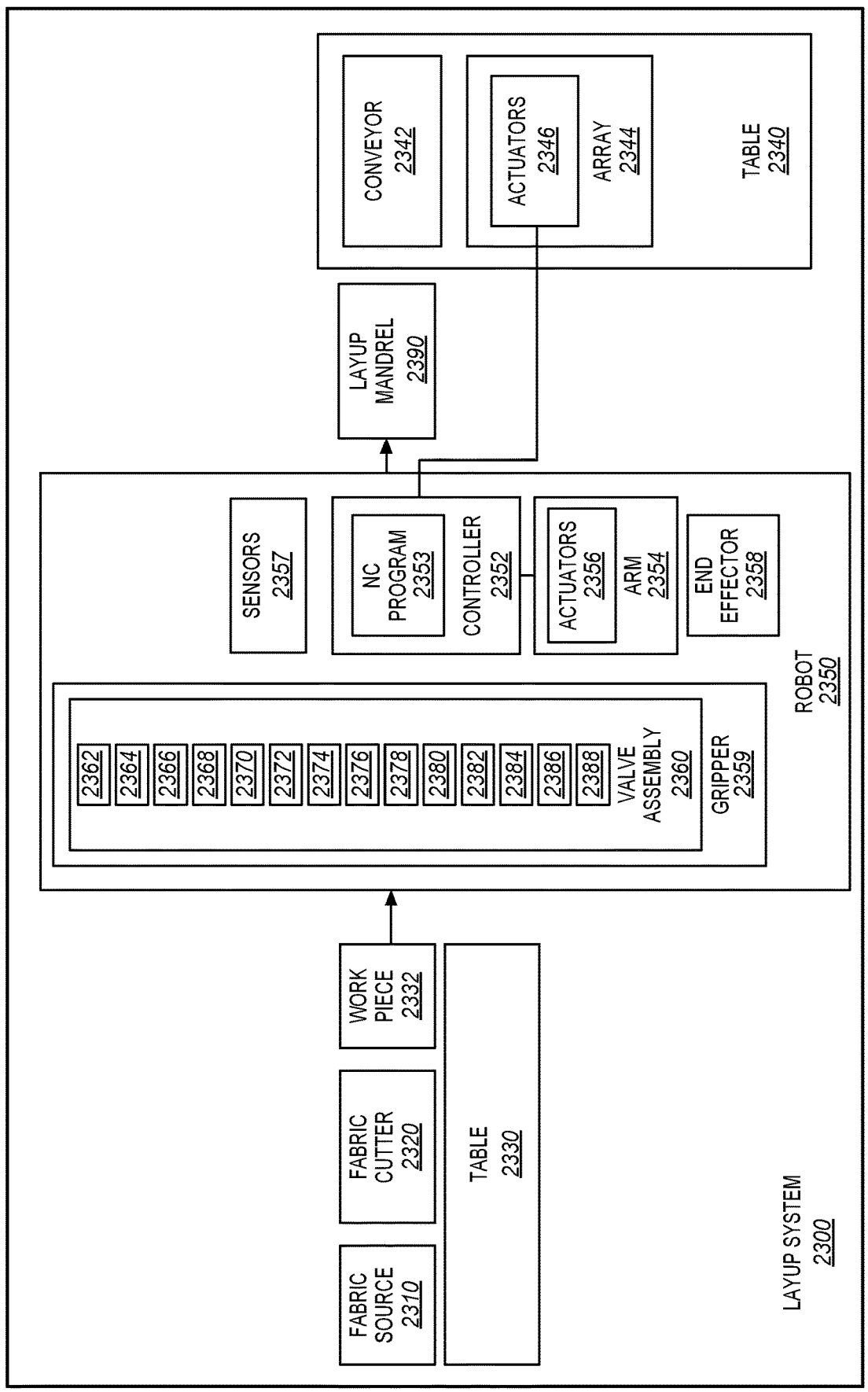
FIG. 23 is a block diagram of a layup system in an illustrative embodiment.

FIG. 23 is a block diagram of a layup system in an illustrative embodiment. Specifically, layup system 2300 includes fabric source 2310 (e.g., a roll of carbon fiber fabric), as well as fabric cutter 2320. Cut work pieces 2332 from fabric source 2310 lay upon table 2330. Robot 2350 picks up work pieces 2332 and places them at layup mandrel 2390, and may do so for example based on input from sensors 2357. Robot 2350 includes controller 2352, which manages the operations of various components based on NC program 2353. Actuators 2356 of robot 2350 drive arm 2354, to which end effector 2358 is attached. Gripper 2359 is attached to end effector 2358, and includes pneumatic fitting 2362, lock nut 2364 and lock nut 2366, valve seat guide 2368, spring 2370, seal 2372, valve seat 2374, and rotating cam valve 2376. Gripper 2359 also includes push cylinder 2378, gasket 2380, frame 2382, seal 2384, lock nut 2386, and vacuum cup 2388. These components enable valve assembly 2360 to transition the rotating cam valve 2376 between open and closed states each time that push cylinder 2378 is pressed.

Figure 24:
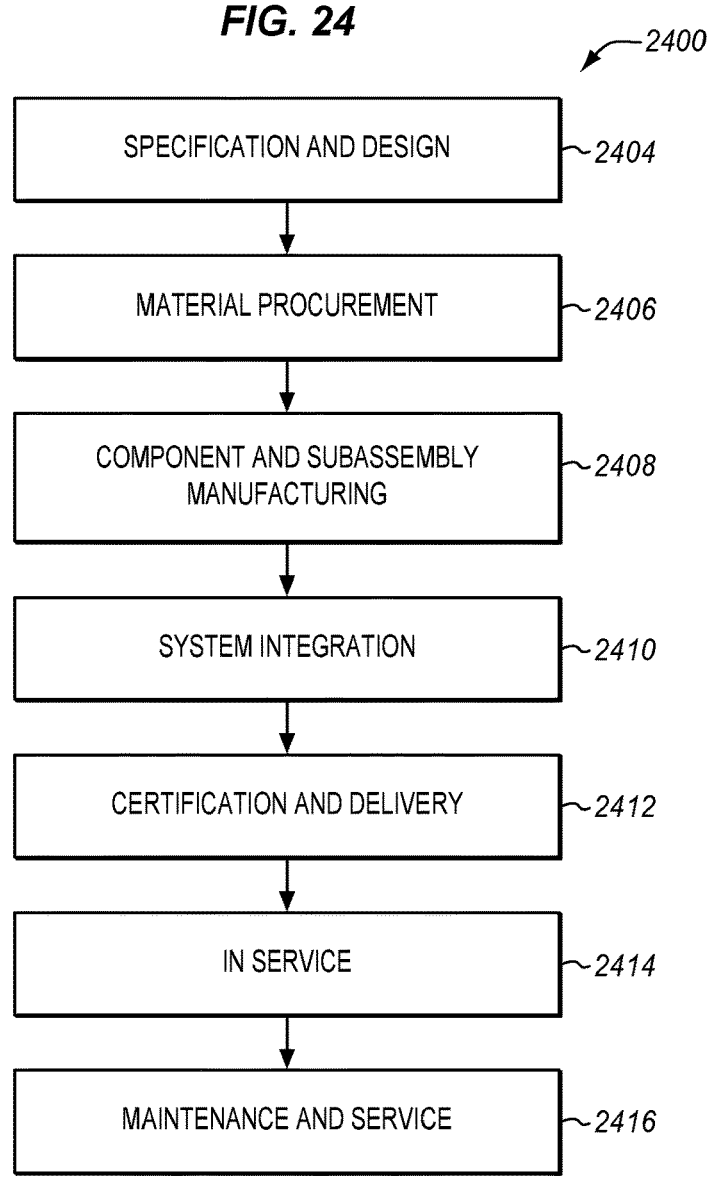
FIG. 24 is a flow diagram of aircraft production and service methodology in an illustrative embodiment.
Figure 25:
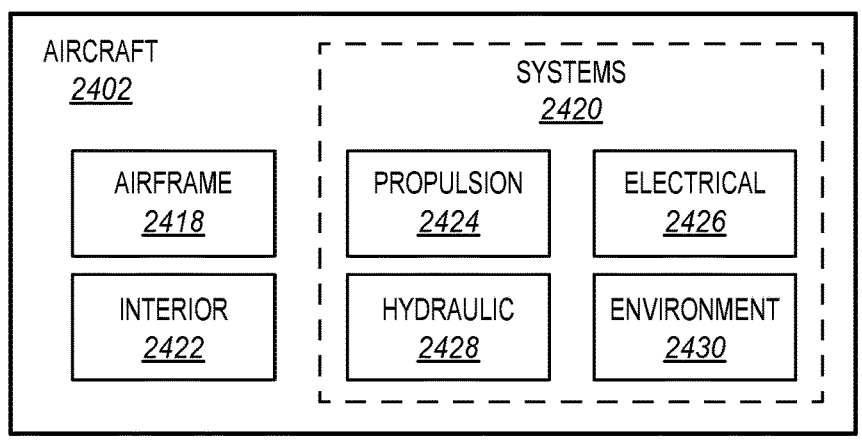
FIG. 25 is a block diagram of an aircraft in an illustrative embodiment.

Referring more particularly to the drawings, embodiments of the disclosure may be described in the context of an aircraft manufacturing and service method 2400 as shown in FIG. 24 and an aircraft 2402 as shown in FIG. 25. During pre-production, illustrative method 2400 may include specification and design 2404 of the aircraft 2402 and material procurement 2406. During production, component and subassembly manufacturing 2408 and system integration 2410 of the aircraft 2402 takes place. Thereafter, the aircraft 2402 may go through certification and delivery 2412 in order to be placed in service 2414. While in service by a customer, the aircraft 2402 is scheduled for routine maintenance and service 2416 (which may also include modification, reconfiguration, refurbishment, and so on). Apparatus and methods embodied herein may be employed during any one or more suitable stages of the production and service method 2400 (e.g., specification and design 2404, material procurement 2406, component and subassembly manufacturing 2408, system integration 2410, certification and delivery 2412, service 2414, maintenance and service 2416) and/or any suitable component of aircraft 2402 (e.g., airframe 2418, systems 2420, interior 2422, propulsion 2424, electrical 2426, hydraulic 2428, environmental 2430).

Each of the processes of method 2400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 2402 produced by illustrative method 2400 may include an airframe 2418 with a plurality of systems 2420 and an interior 2422. Examples of high-level systems 2420 include one or more of a propulsion system 2424, an electrical system 2426, a hydraulic system 2428, and an environmental system 2430. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 2400. For example, components or subassemblies corresponding to production stage 2408 may be fabricated or manufactured in a manner similar to components or subassemblies produced while the aircraft 2402 is in service. Also, one or more apparatus embodiments, method embodiments, or a combination thereof may be utilized during the production stages 2408 and 2410, for example, by substantially expediting assembly of or reducing the cost of an aircraft 2402. Similarly, one or more of apparatus embodiments, method embodiments, or a combination thereof may be utilized while the aircraft 2402 is in service, for example and without limitation, to maintenance and service 2416. For example, the techniques and systems described herein may be used for steps 2406, 2408, 2410, 2414, and/or 2416, and/or may be used for airframe 2418 and/or interior 2422. These techniques and systems may even be utilized for systems 2420, including for example propulsion 2424, electrical 2426, hydraulic 2428, and/or environmental 2430.

In one embodiment, a part comprises a portion of airframe 2418, and is manufactured during component and subassembly manufacturing 2408. During this process, robot 140 may utilize its valve assemblies 200 to selectively apply vacuum in desired shapes. The part may then be assembled into an aircraft in system integration 2410, and then be utilized in service 2414 until wear renders the part unusable. Then, in maintenance and service 2416, the part may be discarded and replaced with a newly manufactured part. Inventive components and methods may be utilized throughout component and subassembly manufacturing 2408 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
locating an array of valves for an end effector;
disposing the end effector over a work piece that has been cut from composite material;
selectively switching valves within the array between open states and closed states based on a shape of the work piece;
selectively applying vacuum through a plurality of valves in a shape that corresponds with the shape of the work piece;
disposing the end effector at the work piece while the vacuum is applied to grip the work piece; and
picking up the work piece by moving the end effector while the vacuum is applied.

2. The method of claim 1 wherein:
selectively applying vacuum comprises selectively applying vacuum to valves that are in the open state without applying vacuum to valves that are in the closed state, causing the array to apply vacuum in a shape that corresponds with the shape of the work piece.

3. The method of claim 1 further comprising:
determining the shape of the work piece based on a Numerical Control (NC) program; and
aligning the end effector with the work piece based on instructions in the NC program,
wherein selectively switching valves is performed based on instructions in the NC program, and
picking up the work piece is performed based on instructions in the NC program.

4. The method of claim 1 further comprising:
sensing the shape of the work piece; and
aligning the end effector with the work piece based on input from sensors,
wherein selectively switching valves is performed in response to sensing the shape of the work piece, and
picking up the work piece is performed based on input from the sensors.

5. The method of claim 1 wherein:
gripping the work piece is performed without gripping objects that are external to the work piece.

6. The method of claim 1 further comprising:
cutting the work piece from a sheet of composite material.

7. The method of claim 1 further comprising:
selectively switching the valves comprises driving actuators into the valves based on a numerical control program for the work piece.

8. The method of claim 1 further comprising:
controlling an amount of air flow through the valves.

9. The method of claim 8 further comprising:
leaving the valves open in response to detecting a drop in vacuum pressure.

10. The method of claim 1 wherein:
each valve is a bi-stable mechanism.

11. The method of claim 1 wherein:
rotating the valves from zero to sixty degrees to transition the valves between the closed states and the open states.

12. A portion of an aircraft assembled according to the method of claim 1.

13. A non-transitory computer readable medium embodying programmed instructions which, when executed by a processor, are operable for performing a method comprising:
locating an array of valves for an end effector;
disposing the end effector over a work piece that has been cut from composite material;
selectively switching valves within the array between open states and closed states based on a shape of the work piece;
selectively applying vacuum through a plurality of valves in a shape that corresponds with the shape of the work piece;
disposing the end effector at the work piece while the vacuum is applied to grip the work piece; and
picking up the work piece by moving the end effector while the vacuum is applied.

14. A portion of an aircraft assembled according to the method defined by the instructions stored on the computer readable medium of claim 13.

15. An apparatus comprising:
a valve assembly comprising:
a valve seat guide;
a valve seat disposed within the valve seat guide that is configured to travel axially within the valve seat guide and includes a first set of vents that extend axially through the valve seat;
a biasing device configured to bias the valve seat in a first axial direction within the valve seat guide;
a rotating cam valve disposed within the valve seat guide that is configured to contact the valve seat, the rotating cam valve comprising a second set of vents that extend axially through the rotating cam valve and align with the first set of vents; and a push cylinder disposed within the valve seat guide that is configured to contact the rotating cam valve and to apply force that pushes the rotating cam valve downward and rotates the rotating cam valve within the valve seat guide, breaking alignment of the second set of vents with the first set of vents.

16. The apparatus of claim 15 wherein:

each vent in the first set of vents occupies a sixty degree arc at the valve seat; and each vent in the second set of vents occupies a sixty degree arc at the rotating cam valve.

17. The apparatus of claim 15 wherein:

the valve seat guide defines a notch, and the valve assembly further comprises a frame that includes a pin aligned with the notch, and the notch is configured to prevent rotation of the frame with respect to the valve seat guide.

18. The apparatus of claim 15 wherein:

the rotating cam valve includes guide pins configured to contact guide pins at the push cylinder.

19. The apparatus of claim 15 wherein:

the push cylinder is entirely internal to the valve seat guide.

20. Fabricating a portion of an aircraft using the apparatus of claim 15.

21. A system comprising:

a robot comprising:

a controller configured to direct operations of the robot in accordance with a Numerical Control (NC) program; and an end effector comprising at least one array of valve assemblies, each valve assembly comprising a bi-stable valve, wherein the controller is operable to selectively apply vacuum pressure, to a work piece that has been cut from composite part, via a set of valves in a shape that corresponds with the shape of the work piece.

22. The system of claim 21 wherein:

each bi-stable valve comprises:

a valve seat guide;

a valve seat disposed within the valve seat guide that is configured to travel axially within the valve seat guide and includes a first set of vents that extend axially through the valve seat;

a biasing device configured to bias the valve seat in a first axial direction within the valve seat guide;

a rotating cam valve disposed within the valve seat guide that is configured to contact the valve seat, the rotating cam valve comprising a second set of vents that extend axially through the rotating cam valve and align with the first set of vents; and a push cylinder disposed within the valve seat guide that is configured to contact the rotating cam valve and to apply force that rotates the rotating cam valve within the valve seat guide, breaking alignment of the second set of vents with the first set of vents.

23. The system of claim 22 wherein:

each vent in the first set of vents occupies a sixty degree arc at the valve seat; and each vent in the second set of vents occupies a sixty degree arc at the rotating cam valve.

24. The system of claim 22 wherein:

for each of the valve assemblies, the valve seat guide defines a notch, the valve assembly further comprises a frame includes a pin aligned with the notch, and the notch is configured to prevent rotation of the frame with respect to the valve seat guide.

25. The system of claim 22 wherein:

the rotating cam valve includes guide pins configured to contact guide pins at the push cylinder.

26. The system of claim 22 wherein:

the push cylinder is entirely internal to the valve seat guide.

27. The system of claim 21 further comprising:

a table that comprises:

a frame;

a conveyor disposed atop the frame; and a group of actuators disposed beneath a section of the conveyor, each actuator having a diameter smaller than a diameter of the valve assemblies, wherein the controller is configured to direct the operations of the group of actuators in accordance with the NC program.

28. Fabricating a portion of an aircraft using the system of claim 21.

29. The system of claim 21 wherein:

the robot further comprises an arm.

* * * * *